United States Patent
Walker et al.

(10) Patent No.: US 11,452,889 B2
(45) Date of Patent: Sep. 27, 2022

(54) DOSED OXYGEN SYSTEMS WITH DELIVERY TUBE ANTI-BLOCKAGE FEATURES AND A METHOD FOR DELIVERING RESPIRATORY GAS

(71) Applicant: Safran Aerotechnics, Plaisir (FR)

(72) Inventors: Stuart David Dixon Walker, Paris (FR); Vincent Gérard Greter, Elancourt (FR)

(73) Assignee: SAFRAN AEROTECHNICS SAS, Plaisir (FR)

( * ) Notice: Subject to any disclaimer, the term of this patent is extended or adjusted under 35 U.S.C. 154(b) by 863 days.

(21) Appl. No.: 16/253,543

(22) Filed: Jan. 22, 2019

(65) Prior Publication Data
US 2019/0224505 A1  Jul. 25, 2019

Related U.S. Application Data

(60) Provisional application No. 62/620,562, filed on Jan. 23, 2018.

(51) Int. Cl.
*A62B 7/14* (2006.01)
*A62B 7/02* (2006.01)

(52) U.S. Cl.
CPC .............. *A62B 7/14* (2013.01); *A62B 7/02* (2013.01); *B64D 2231/025* (2013.01)

(58) Field of Classification Search
CPC .... A62B 7/14; A62B 7/02; A62B 7/00; A62B 7/04; A62B 7/10; A62B 7/12; A62B 27/00; B64D 2231/025; B64D 2231/00; B64D 2231/02
See application file for complete search history.

(56) References Cited

U.S. PATENT DOCUMENTS

| | | | |
|---|---|---|---|
| 7,481,216 B1 | 1/2009 | Degenhardt et al. | |
| 7,784,463 B2 | 8/2010 | Cannon | |
| 8,517,018 B2 | 8/2013 | Wenzel et al. | |
| 8,733,352 B2 | 5/2014 | Bailey et al. | |
| 9,089,721 B1* | 7/2015 | Horstman | A62B 7/14 |
| 2006/0118115 A1* | 6/2006 | Cannon | A62B 7/04 |
| | | | 128/204.26 |
| 2013/0206144 A1* | 8/2013 | Ahmad | A61M 16/0858 |
| | | | 128/204.23 |
| 2013/0340760 A1 | 12/2013 | Brumley et al. | |

(Continued)

FOREIGN PATENT DOCUMENTS

| | | |
|---|---|---|
| CN | 106806999 A | 6/2017 |
| EP | 2630992 A1 | 8/2013 |
| EP | 3348300 A1 | 7/2018 |

OTHER PUBLICATIONS

Europe Patent Application No. 19152908.0, Extended European Search Report, dated Aug. 7, 2019.

*Primary Examiner* — Joseph D. Boecker
*Assistant Examiner* — Brian T Khong
(74) *Attorney, Agent, or Firm* — Kilpatrick Townsend & Stockton LLP (57) ABSTRACT

Oxygen-delivery systems are described. The systems may supply emergency respiratory gas on demand to aircraft passengers. To reduce risk of blockage of tubes delivering anti-blocking gas to the face masks worn by the passengers, the systems may be designed to provide a continuous trickle flow of respiratory gas, or one or more anti-blocking pulses of gas, into a delivery tube.

16 Claims, 3 Drawing Sheets

(56) References Cited

U.S. PATENT DOCUMENTS

2014/0261426 A1* 9/2014 Ahmad ............... A61M 16/026
  128/204.23
2018/0200473 A1 7/2018 Lin

* cited by examiner

DOSED OXYGEN SYSTEMS WITH DELIVERY TUBE ANTI-BLOCKAGE FEATURES AND A METHOD FOR DELIVERING RESPIRATORY GAS

CROSS REFERENCE TO RELATED APPLICATIONS

This application claims the benefit of and priority to U.S. Provisional Patent Application Ser. No. 62/620,562, filed on Jan. 23, 2018, the entire contents of which application are hereby incorporated herein by this reference.

FIELD OF THE INVENTION

This invention relates to systems for supplying oxygen or other respiratory gas to passengers and more particularly, although not necessarily exclusively, to emergency oxygen systems of aircraft in which additional gas is provided, continuously or periodically or irregularly, to reduce the risk of blockages occurring in tubes delivering the respiratory gas to the passengers.

BACKGROUND OF THE INVENTION

During cruise portions of flight, most commercial passenger aircraft operate at altitudes exceeding four thousand two hundred meters (fourteen thousand feet). At these altitudes, insufficient oxygen may be present in the ambient air to sustain human consciousness or life. Accordingly, cabins of the aircraft are pressurized, often to altitudes equating approximately two thousand four hundred meters (eight thousand feet). At such "cabin altitudes," sufficient oxygen normally will be present in ambient air to avoid hypoxia and thereby sustain human consciousness and life.

Loss of cabin pressurization when an aircraft is flying above, e.g., four thousand two hundred meters (fourteen thousand feet), therefore, creates risk of passengers (and crew) experiencing hypoxia. Aircraft hence typically are fitted with emergency oxygen systems configured to supply supplemental oxygen to passengers temporarily while an aircraft operator reduces the flight altitude of the aircraft. The systems include cup-shaped face masks connected to sources of oxygen via flexible tubing.

U.S. Pat. No. 7,784,463 to Cannon describes such an emergency oxygen system for use on-board aircraft. A pressure sensor is fitted to each mask and "generates a signal when a positive pressure is detected within the mask such as is caused by exhalation." See Cannon, col. 5, 11. 13-15. The detected exhalation causes a controller to open an inlet valve associated with the mask to allow a pre-selected volume of oxygen to flow into an associated reservoir bag. See id., 11. 40-43. This pre-selected volume is then provided to the passenger at the beginning of the passenger's inhalation phase, supposedly for most efficient transfer of oxygen to the passenger's blood. See id., col. 6, 11.7-15.

Clear, therefore, is that detection of a pressure change within a mask can be important for optimal functioning of certain emergency oxygen systems. Although systems of the Cannon patent apparently fit pressure sensors directly onto or within face masks, this approach exposes the sensors to contact with and actions of the passengers who, in chaotic emergency situations, may inadvertently damage the sensors or disrupt their operation. Resolution of this issue may occur by moving the pressure sensors upstream of the associated masks. However, doing so risks that the sensors may fail to detect respirations should the delivery tubes become blocked downstream of the sensors (i.e. between the sensors and the associated masks), as when moisture in the masks freezes, for example.

SUMMARY OF THE INVENTION

The present invention seeks to identify solutions mitigating a possibility of the delivery tubes becoming blocked. The solutions are especially advantageous for "on-demand" types of emergency oxygen systems, when respiratory gas is supplied in doses, or pulses as demanded by passengers. In some of the innovative systems, a bypass is formed about a delivery valve of each mask. Regardless of the state of the delivery valve, a trickle of respiratory gas flows continuously through each delivery tube to the corresponding mask. This trickle flow typically will be adequate to prevent blockage of the tube notwithstanding moisture accumulation within the mask.

In other systems of the invention, the continuous trickle flow may be replaced by a series of, preferably, very short-duration "anti-blocking" oxygen pulses spaced over time. Such spacing may be regular, in which event the anti-blocking pulses may at times overlap with doses of respiratory gas as demanded (often irregularly) by a passenger. Alternatively, the anti-blocking pulses may be adapted to the breathing pattern of the passenger in an effort to avoid overlapping with the doses supplied to the passenger for breathing. Yet alternatively, an anti-blocking pulse may be generated in response to failure of a sensor to detect a respiration (a single breath) after a specified interval of time (e.g. twenty seconds).

It thus is an optional, non-exclusive object of the present invention to provide systems for delivering respiratory gas as demanded by passengers on-board vehicles.

It is an additional optional, non-exclusive object of the present invention to provide respiratory gas-delivery systems designed to reduce possibility of gas-delivery tubes being blocked downstream of associated pressure (or other) sensors.

It is another optional, non-exclusive object of the present invention to provide gas-delivery systems in which a trickle of respiratory gas flows continuously through each delivery tube to an associated face mask.

It is a further optional, non-exclusive object of the present invention to provide gas-delivery systems in which anti-blocking pulses may be supplied regularly, irregularly, or in response to sensor signals indicating no detection of respiration after a predetermined interval of time.

More accurately, according to a first aspect of the invention, the system for delivering respiratory gas to passengers on-board an aircraft, comprises:

(i) a source of respiratory gas,
(ii) at least a face mask for passenger,
(iii) a delivery valve interposed between the source of respiratory gas and the face mask associated to the delivery valve, and
(iv) a pressure sensor configured to detect passenger respiration and send a respiration signal upon detection of the passenger respiration,
(v) a controller configured to control the delivery valve opening for supplying the face mask with a dose of respiratory gas (a substantially constant flow of respiratory gas during a predetermined time) based on the passenger respiration detection, and
(vi) an anti-blocking device configured to supply the face mask with anti-blocking gas, so that blockage is removed.

Thus, the supply of anti-blocking gas reduces the risk of respiratory detection missed because of an obstruction between the pressure sensor and the face mask in the delivery tube. Indeed, the supply of anti-blocking gas should remove the cause of the obstruction.

The respiratory gas has a high oxygen rate, substantially pure oxygen, the rate of oxygen depending on the type of source of oxygen. The anti-blocking gas can be identical to the respiratory gas and be provided by the source of respiratory gas or a different gas.

Preferably the pressure sensor is configured to sense the pressure away from (upward) the face mask, and the anti-blocking device is configured to supply the face mask with anti-blocking gas through a delivery tube, at least between the pressure sensor and the face mask.

According to another feature in accordance with the invention, the anti-blocking device preferably comprises an orifice configured to allow trickle flow of anti-blocking gas.

Thus, the flow of anti-blocking gas is continuous, so that not only the obstruction is promptly removed, but also it is prevented.

According to a supplementary feature in accordance with the invention, the anti-blocking device preferably comprises a bypass bypassing the delivery valve so as to allow trickle flow of anti-blocking gas regardless of the state of the delivery valve.

Thus, the anti-blocking device can be easily implemented without detrimental effect on the management of the respiratory gas supplying the face mask through the delivery valve.

According to an additional feature in accordance with the invention, the bypass preferably causes trickle flow of anti-blocking gas between the source of respiratory gas and the associated face mask regardless of the state of the delivery valve.

According to an alternative or additional feature in accordance with the invention, the anti-blocking device is preferably configured to supply the face mask with the respiratory gas as anti-blocking gas.

Thus, the system is simpler and the anti-blocking gas provides an additional amount of oxygen to the passenger.

According to another alternative or additional feature in accordance with the invention, preferably the system comprises a main delivery tube connecting the delivery valve to the face mask, the bypass comprises a second delivery tube in parallel with the main delivery tube and terminating at the face mask, the orifice is disposed in the second delivery tube, and the pressure sensor communicates with the second delivery tube downstream the orifice.

According to another alternative or additional feature in accordance with the invention, preferably the system comprises a main delivery tube connecting the delivery valve to the face mask, and the pressure sensor communicates with the main delivery tube downstream the bypass.

In advantageous embodiments, the system preferably further has one or more of the following features:
- the anti-blocking device is configured to supply the face mask with pulses of anti-blocking gas;
- the anti-blocking device is configured to supply the face mask with pulses of anti-blocking gas, each pulse of anti-blocking gas having a volume in the range between 0.2 milliliter and 3 milliliters, preferably between 0.5 milliliter and 1.5 milliliters;
- the system is configured to supply the face mask with doses, each dose having a volume of 5 milliliters or more, preferably 10 millimeters or more;
- the anti-blocking device is configured to supply the face mask with pulses of anti-blocking gas at regular interval of time;
- the regular interval of time is in the range between 5 seconds and 20 seconds;
- the system is configured to supply the face mask with a pulse of anti-blocking gas at a predetermined time after having supplied the face mask with a dose of respiratory gas;
- the predetermined time is in the range between 10 seconds and 30 seconds;
- the system is configured to supply the face mask with a pulse of anti-blocking gas at a calculated time after having supplied the face mask with a dose of respiratory gas;
- the system is adapted to acquire data relating to the breathing pattern of the associated passenger;
- the controller is adapted to determine the calculated time based on the acquired data;
- the controller is configured to receive a cabin pressure signal and to determine the dose of respiratory gas (predetermined time of delivery valve opening) based on the cabin pressure signal, and the system is configured to supply the face mask with pulses of anti-blocking gas irrespective of the cabin pressure signal;
- the controller is configured to receive a depressurization signal, and the system is configured to supply each face mask with anti-blocking gas upon receipt of the depressurization signal;
- the system is configured to continuously open the delivery valve during an opening time, in order to supply the dose of respiratory gas, only one time for each passenger respiration detection;
- the system is designed to reduce the occurrence of in particular moisture blocking a delivery tube by which the gas is delivered to a mask donned by the passenger.

According to a second aspect, the invention relates to a method for delivering respiratory gas to passengers on-board an aircraft, comprising:
detecting respirations of a passenger in a face mask associated to the passenger,
supplying the face mask with a dose of respiratory gas based on each passenger respiration detection, and
supplying the face mask with anti-blocking gas, so that the occurrence of blockage, in particular due to moisture, preventing detection of respiration is reduced.

In particular moisture should be understood as liquid moisture, frozen moisture or another element preventing detection of respiration.

In advantageous embodiments, the method preferably further has one or more of the following features:
- the method comprises supplying the face mask with anti-blocking gas either continuously or in a pulsed form;
- the method comprises supplying the face mask with anti-blocking gas either continuously or in a pulsed form and supplying more respiratory gas than anti-blocking gas (a higher volume of respiratory gas than anti-blocking gas at cabin pressure), preferably 5 times or more respiratory gas than anti-blocking gas (the volume of respiratory gas supplying the face mask is at least 5 times higher than the volume of anti-blocking gas supplying the face mask by breathing cycle), so that the risk of respiration detection failure is reduced while avoiding supplying a huge volume of anti-blocking gas;
- a trickle flow of anti-blocking gas is continuously supplied to the face mask;
- the trickle flow is 10 milliliters per minute or less, so that the anti-blocking gas supplying the face mask reduce the reduce the risk of respiratory detection failure without substantially increasing the weight of the system for supplying the passenger with respiratory during the same time period;

the anti-blocking gas is supplied in a pulsed form;

the pulses of anti-blocking gas are supplied at times differing from times at which the doses of respiratory gas are supplied to the face mask, so that the volume of anti-blocking gas supplying the face mask is reduced without increasing the risk of respiration detection failure as the risk is avoided by the flow of respiratory gas supplying the face mask;

the method comprises supplying the face mask with pulses of anti-blocking gas having a volume in the range between 0.2 milliliter and 3 milliliters, preferably between 0.5 milliliter and 1.5 milliliters, so that the volume of anti-blocking gas supplying the face mask is quite low while being sufficient for efficiently avoiding tube blocking;

the method comprises supplying the face mask with pulses of anti-blocking gas at regular interval of time;

the method comprises supplying the face mask with a pulse of anti-blocking gas at a predetermined time after having supplied the face mask with a dose of respiratory gas, so that the balance between efficiency and volume of anti-blocking gas is improved;

the predetermined time is in the range between 10 seconds and 30 seconds; so that the balance between efficiency and volume of anti-blocking gas is better improved;

acquiring statistical data relating to the breathing pattern of the associated passenger during several breathing cycles, and supplying the face mask with a pulse of anti-blocking gas based on the acquired statistical data; the data acquired enable an adjustment to the breathing cycle of the passenger which reduces the amount of anti-blocking gas supplied to the face mask;

calculating at least an average time period of the breathing cycles of the associated passenger and a threshold time calculated based on the calculated average time period, and supplying the face mask with a pulse of anti-blocking gas in case the time period of a breathing cycle appears longer than the threshold time; the supply of the face mask with anti-blocking gas is thus better adjusted to the physiological characteristics of the associated passenger;

the method comprises adjusting the volume of the dose of respiratory gas based on the cabin pressure, and supplying the face mask with pulses of anti-blocking gas irrespective of the cabin pressure;

the method comprises supplying each face mask with anti-blocking gas in case of depressurization occurrence, so that the risk of missing the first respiration of a passenger after having donned the face mask due to an obstruction of the delivering tube before use of the system is reduced;

the method comprises supplying simultaneously supplying each face mask with anti-blocking gas in case of depressurization occurrence;

the method comprises opening sealed oxygen cylinder and simultaneously supplying each face mask with anti-blocking gas in case of depressurization occurrence before supplying the face mask with a dose of respiratory gas based on the passenger respiration detection;

the face mask is supplied with respiratory gas as anti-blocking gas, so that the anti-blocking gas supplying the face mask provides a part of the oxygen required by the passenger even if it is not provided at the best time of the breathing cycle of the passenger;

the method comprises supplying the face mask with doses, each dose having a volume of 5 milliliters or more, preferably 10 millimeters or more;

the method comprises supplying the face mask with anti-blocking gas when inhalation is not detected or when exhalation is detected, so that anti-blocking gas with a low density may be supplied to the passenger in order to reduce the weight of the system;

the method comprises supplying directly (without reservoir bag or similar means for briefly storing respiratory gas) the face mask with anti-blocking gas, so that the system is simpler, troubles during mask falling may be avoided and mixture between the respiratory gas and the anti-blocking gas is avoided when one differs from the other;

the method comprises detecting exhalation, supplying the face mask with anti-blocking gas when exhalation is detected, so that the anti-blocking gas is supplied quite close before inhalation of the user and the risk of blockage is further reduced.

The method comprises continuously opening the delivery valve during an opening time, in order to supply the dose of respiratory gas only one time by passenger respiration.

Other objects, features, and advantages of the present invention will be apparent to persons skilled in the art with reference to the remaining text and drawings of this application.

DETAILED DESCRIPTION

Figure 1:
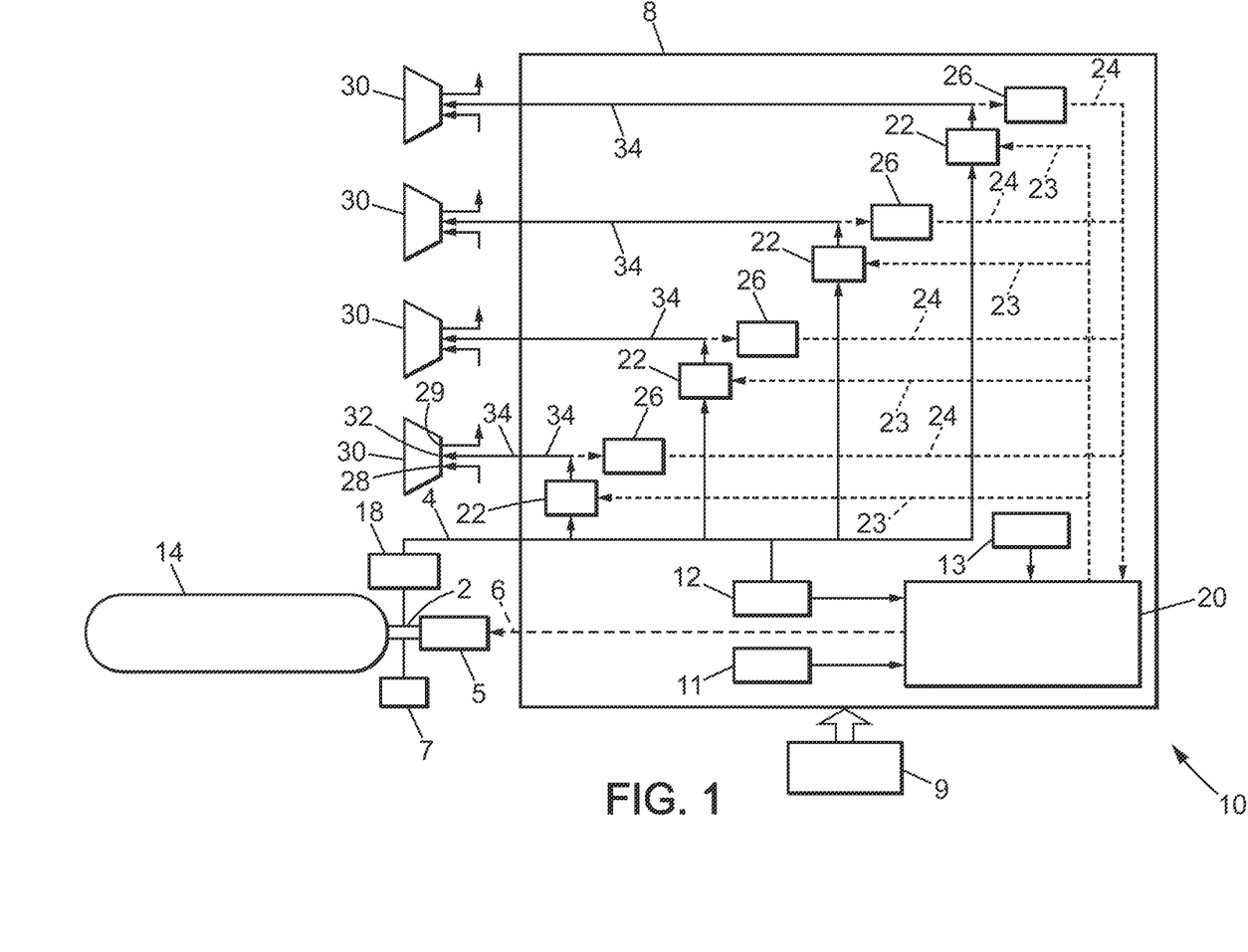
FIG. 1 is a schematic representation of a four-passenger on-demand emergency oxygen system of the present invention.

Depicted in FIG. 1 are components of a four-passenger emergency oxygen system 10. The system 10 is placed in the cabin of an aircraft, usually above the head of a group of passengers, preferably a group of 3 or 4 passengers in the illustrated embodiment. The cabin is pressurized at a cabin pressure, usually referred to as cabin altitude (the altitude corresponding to the cabin pressure) by a pressurizing device which maintains the pressure above a threshold pressure, in other words which maintains the cabin altitude below a corresponding threshold altitude which is usually between two thousand four hundred meters (eight thousand feet) and one thousand eight hundred meters (six thousand feet). The system 10 is intended to provide oxygen to the passengers in the event of a loss in cabin pressure.

System 10 may include a source of respiratory gas 14. In the embodiment represented in FIG. 1 the source of respiratory gas 14 is a cylinder. The respiratory gas in the source of respiratory gas 14 has a high rate of oxygen, higher than 95%, preferably higher than 99%, so that the respiratory gas is quite pure oxygen. The respiratory gas in the source of respiratory gas 14 is at a very high pressure, preferably about 200 bar (3000 psig), but the respiratory gas may be supplied at other gauge pressures instead. Beneficially, the source of respiratory gas 14 may be at least one sealed container, with the seal configured to be ruptured to commence flow of respiratory gas from the container.

System 10 additionally may include manifold or housing 2 in gaseous communication with the source of respiratory gas 14. Housing 2 may, if appropriate, have a relief valve 7 or other means of venting gas if the pressure thereof exceeds a particular threshold. Downstream of housing 2 may be HP reducer and/or a regulator 18, which functions to decrease or otherwise regulate the pressure of the oxygen from housing 2 before the oxygen flows to passengers of an aircraft or other vehicle. The HP reducer and/or the regulator 18 preferably reduces the absolute pressure between 1.5 bar and 6 bar.

As illustrated in FIG. 1, the tubing 4 may convey lower-pressure oxygen from the regulator 18 in parallel to delivery valves 22. Four such delivery valves 22 are shown in FIG. 1, one delivery valve 22 corresponding to each of four passenger masks 30. When a delivery valve 22 is open, the respiratory gas may flow through the delivery valve 22 to the corresponding mask 30 for inhalation by a passenger wearing that mask 30. Preferably, the delivery valves 22 reside on one or more control boards 8.

Included as part of the system 10 may be an initiator 5. The initiator 5 may comprise any suitable mechanism for establishing gas flow from the source of respiratory gas 14 to housing 2. One possible version of initiator 5 may utilize at least one SMA (Shape Memory Alloy) whose change in shape upon heating may cause a seal of the source of respiratory gas 14 to be punctured. The initiator 5 is connected to the controller 20 by an electrical wire 6, so that the initiator 5 is controlled by the controller 20.

The controller 20 may be present on the control board 8. The controller 20 may receive input from an aircraft altitude sensor 11, a temperature sensor 12 and a cabin altitude sensor 13, relating to such values as the altitude of the aircraft and the temperature and pressure of the air ambient in the aircraft cabin. In practice the aircraft altitude sensor 11 and the cabin altitude sensor 13 detect the pressure outside the aircraft and the pressure in the cabin of the aircraft.

The controller 20 additionally may be signaled by respiration sensors 26 that detect respiration phases and in particular that corresponding passengers are attempting to inhale through masks 30 or are ending exhaling. The respiration sensors 26 are away from the face masks 30. The controller 20 is preferably connected to the respiration sensors 26 by a respiration sensor wire 24. Output signals from the controller 8 may be transmitted to initiator 5 (signaling that flow of oxygen from source 14 is needed) through the electrical wire 6 and to the delivery valves 22, through another electrical wire 23, causing them to open and close as appropriate.

Battery 9, or any other suitable electricity source, may power electrical and electronic components of system 10. Although a four-person system 10 is detailed for convenience, persons skilled in the art will recognize that system 10 may service more or fewer than four passengers as appropriate or desired.

Each face mask 30 is configured for use by an aircraft passenger when the cabin altitude is sufficiently high as to induce hypoxia. The face mask 30 is directly connected to the delivery valve 22 by a delivery tube 34 (without reservoir bag), so that the respiratory gas cannot be accumulated. The face mask 30 comprises at least one inlet valve 32 intended to reduce the risk of ingression of water, ice or dust into the main delivery tube 34 while enabling the face mask 30 to be supplied with respiratory gas. Each mask 30 further comprises an inhalation valve 28 which enables each passenger to breath ambient air diluting the respiratory gas. Each face mask 30 also comprises an exhalation valve 29 to enable gas within the face mask 30 to exhaust the face mask 30 when the passenger exhales. The inhalation valve 28, the exhalation valve 29 and the inlet valve 32 are preferably check valves.

Figure 2:
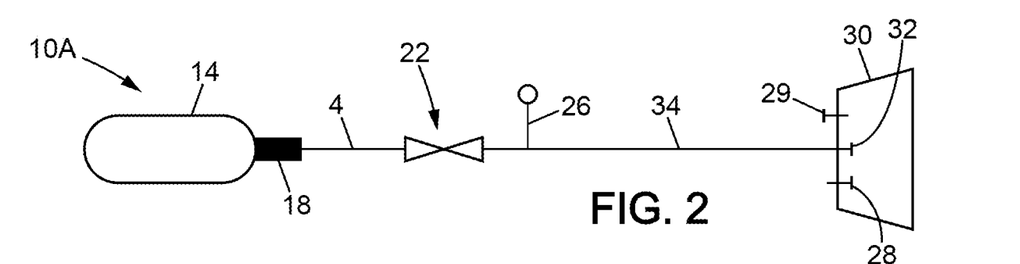
FIG. 2 is a schematic representation of an exemplary on-demand emergency oxygen system providing anti-blocking pulses.

FIG. 2 schematically represents an embodiment of an on-demand emergency oxygen system 10A system providing anti-blocking pulses. More accurately, FIG. 2 illustrates the supply of respiratory gas to one of the face masks 30. In order to ease the understanding the system 10A is represented for only one of the face masks 30. The complete system 10A can be directly derived from FIGS. 1 and 2.

In gaseous communication downstream from the source of respiratory gas 14 are the regulator 18, the delivery valve 22, the respiration sensor 26 and the face mask 30. The regulator 18 and the delivery valve 22 are connected by the tubing 4. The delivery valve 22 and the face mask 30 are connected by delivery tube 34. The delivery valve 22 is preferably an on/off electro-valve.

Figure 3:
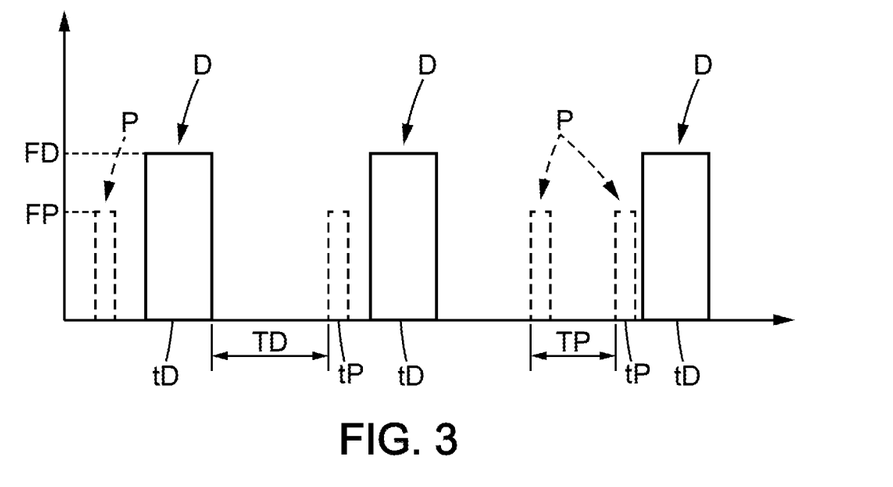
FIG. 3 is an exemplary graphical representation of gas provision over time for the system providing anti-blocking pulses of FIG. 2.

FIG. 3 illustrates a graph of respiratory flow to the face mask 30 as a function of time. After the passenger dons the face mask 30 and the seal of the source of respiratory gas 14 is punctured by the initiator 5, the respiration sensor 26 reacts to pressure changes caused by the passenger's breathing. Signals from the respiration sensor 26 are transmitted to the controller 20, which opens and closes delivery valve 22. Opening and closing of the delivery valve 22 allow doses of respiratory gas to flow from the source 14 to the face mask 30 via the delivery tube 34 to fulfill respiratory requirements of the passenger.

More precisely, when the passenger inhales, the inhalation generates a decrease of the pressure in the face mask 30, the inlet valve 32 opens, the pressure in the delivery tube 34 decreases and the respiration sensor 26 detects the pressure change. The controller 20 detects the inhalations of the passenger due to the inhalation signal received from the respiration sensor 26 through the respiration sensor wire 24 upon detection of the passenger inhalation. The controller 20 determines the minimum volume of respiratory gas required by the passenger based on at least one of the cabin altitude, the temperature and the aircraft altitude, sensed by the cabin altitude sensor 13, the temperature sensor 12 and the aircraft altitude sensor 11. Then, the controller 20 determines a dose D of respiratory gas to be supplied to the face mask 30. The controller 20 controls the delivery valve 22. The delivery valve 22 is preferably continuously open during an opening time period tD, in order to supply the whole dose D of respiratory gas per respiration for each passenger. In an alternative embodiment, the delivery valve could be controlled in PWM (Pulse Width Modulation) during a predetermined time period or during the inhalation period.

Each dose D has preferably a volume of 5 milliliters or more, preferably 10 milliliters or more, the volume being considered at the cabin pressure (when supplied in the face mask 30).

Moreover, each face mask 30 is supplied with anti-blocking pulses P of anti-blocking gas during a very short time period tP. In the embodiment shown, the anti-blocking gas is respiratory gas supplied by the source 14.

In FIG. 3, the flow FP of the anti-blocking pulses P during the opening time period tD of the pulse is shown lower than the flow FD during the opening time period tD of the dose D. The reason is that the time period tP is very short, so that the delivery valve 22 is not sufficiently opened to get the flow FD. In a variant the flow FP of the anti-blocking pulses P is equal to the FD of the dose D depending on the speed of opening of the delivery valve 22 and the time tP.

Both doses D and anti-blocking pulses P may be produced by the same delivery valve (e.g. valve 22); alternatively, different delivery valves may be employed to generate the two pulsed flows.

The volume of anti-blocking gas supplied to the face mask 30 is preferably between 0.2 milliliter and 3 milliliters, more preferably between 0.5 millimeter and 1.5 milliliter.

Provision of anti-blocking pulses P may be regular as a function of time, in which case they may at times overlap with doses D. Alternatively, anti-blocking pulses P may be synchronized with doses D to avoid this overlap. As another approach, an anti-blocking pulse P may be generated in response to failure of the respiration sensor 26 to detect a respiration after a specified interval of time.

In particular, in an embodiment, the pulse of anti-blocking gas is supplied to the face mask 30 at a predetermined time period TD after the dose D for each respiration (unless another respiration is detected in the meantime), the time period TD being preferably between 10 seconds and 30 seconds.

Moreover, the face mask 30 may be repeatedly supplied with anti-blocking pulses P at regular interval TP of time which is preferably between 5 seconds and 20 seconds.

In a preferred alternative embodiment, the time period TD is adapted to the breathing pattern of the user. Data relating to the breathing pattern of the associated passenger are acquired over a period of usage of several breathing cycles (for instance the last 10 breathing cycles). The acquired data preferably include the time period of the breathing cycle and may also include the time period of the inhaling phase and the time period of the exhaling phase. The systems 10A, 10B, 10C may include further pressure sensors if appropriate. Then, statistical information including an average time period and a standard deviation of the associated passenger are calculated by the controller 20. The controller 20 also calculates a threshold time based on the statistical information. Preferably, the threshold time is calculated the average time ($\mu$) plus two standard deviations. If the delay between two respirations exceeds the threshold time, say, the average time plus two standard deviations, then a deblocking pulse is delivered. This would reduce the oxygen wasted by delivering a deblocking pulse for a slow breather (e.g. a healthy adult) and could predict and deblock the mask of a fast breather (e.g. a child) earlier.

Otherwise, it should be noticed that the time period tD of the dose D is adjusted based on the cabin pressure, the temperature and/or the aircraft pressure whereas the cabin pressure, the temperature and the aircraft pressure have no influence on the time period tD of each pulse P.

In general, the respiratory gas is most efficiently supplied to passengers during the early portions of their inhalation cycles; ambient air (or a mixture of ambient air and oxygen) typically may be furnished for the remainder of the inhalation cycles.

In order to reduce the risk of detection failure of a passenger respiration by the respiration sensor 26, in case of depressurization occurrence detected by the cabin altitude sensor 13 or by the opening of the box housing the passenger masks or other means, the controller 20 controls the delivery valve 22 associated with each passenger in order to simultaneously supply each face mask 30 with a pulse P as a cautionary measure, before detecting any respiration and providing a dose D of respiratory gas.

Figure 4A:
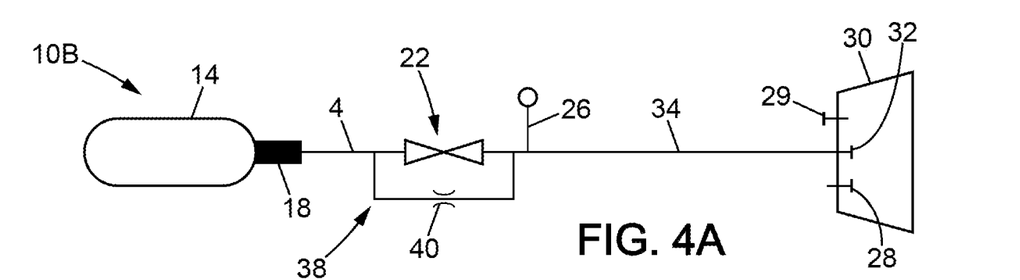
FIGS. 4A, 4B and 4C are schematic representations of exemplary on-demand emergency oxygen systems of the present invention providing continuous trickle flows.

FIG. 4A schematically illustrates an alternative system 10B of the present invention. Like system 10A, system 10B may include a supply of respiratory gas (e.g. oxygen cylinder 14) in gaseous communication with regulator 18, delivery valve 22, respiration sensor 26, face mask 30, and delivery tube 34. However, additionally included in system 10B may be bypass 38. As shown in FIG. 4A, bypass 38 beneficially originates upstream of valve 22 (preferably between regulator 18 and valve 22) and terminates downstream of the delivery valve 22 (preferably between valve 22 and face mask 30). Bypass 38 hence may allow respiratory gas to flow from cylinder 14 to face mask 30 at all times system 10B is active, regardless of whether valve 22 is open or closed.

The continuous flow of pressurized gas allowed by bypass 38 may operate to prevent ingress of water or ice into tube 34. Even should such water or ice block the delivery tube 34, moreover, the pressurized flow may act to discharge the blockage from the delivery tube 34 (back into mask 30). Generally, however, the majority of respiratory gas will continue to be supplied to the passenger through the opening and closing of valve 22, with only a trickle of gas flowing through bypass 38. In the embodiment shown in FIG. 4A, bypass 38 preferably comprises an orifice 40 of restricted section.

Bypass 38 may be created in any suitable manner. As one example, the orifice 40 may constitute a tube of specified diameter smaller than the diameter of the delivery tube 34. As another example, the orifice 40 may include a bleed opening of delivery valve 22 upstream of its closure element and which communicates with delivery tube 34. As another example, the delivery valve 22 may include a moving element and a seat, the moving element being mobile between a first position in which the moving element contact the seat and a second position in which the moving element is away from the seat, and a bleed opening remaining between the moving element and the seat due to a slot in the seat, the slot forming the orifice 40.

Figure 5:
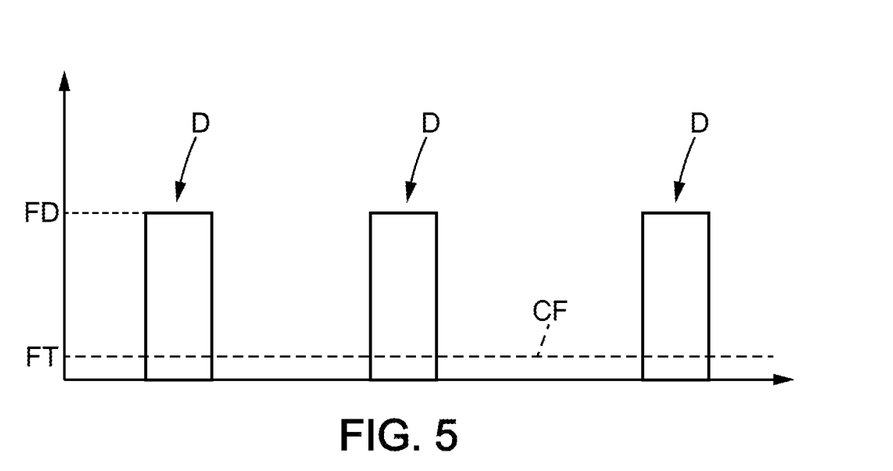
FIG. 5 is an exemplary graphical representation of oxygen provision over time for systems of FIGS. 4A, 4B and 4C.

Depicted in FIG. 5 is an exemplary graph of respiratory gas flow to a face mask 30 as a function of time. The graph illustrates the concept of systems 10B, as well as alternative systems 10C and 10D: Opening and closing of the delivery valve 22 produces doses D of oxygen available for respiration by the passenger having donned the face mask 30. Meanwhile, the bypass 38 provides a continuous flow CF of anti-blocking oxygen, preferably at a (trickle) rate whose amplitude FT is significantly lower than the amplitude FD of doses D, preferably at least 10 times lower than the amplitude FD of doses D. The amplitude FT of the anti-blocking gas is preferably 10 milliliter per minute or less.

Figure 4B:
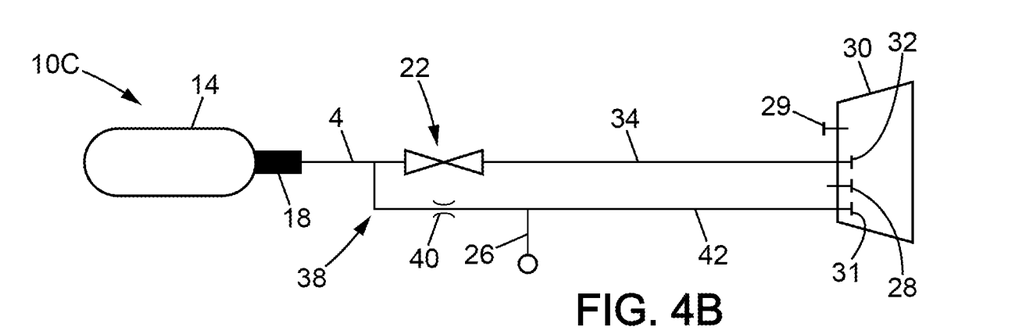

Exemplary system 10C of the present invention is schematically represented by FIG. 4B. System 10C may be similar to system 10B except that the bypass 38 is shown as terminating at the face mask 30 and with a bypass inlet 31, effectively forming a second delivery tube 42 in parallel with the main delivery tube 34. FIG. 4B additionally illustrates respiration sensor 26 as communicating with the second delivery tube 42 if desired.

Figure 4C:
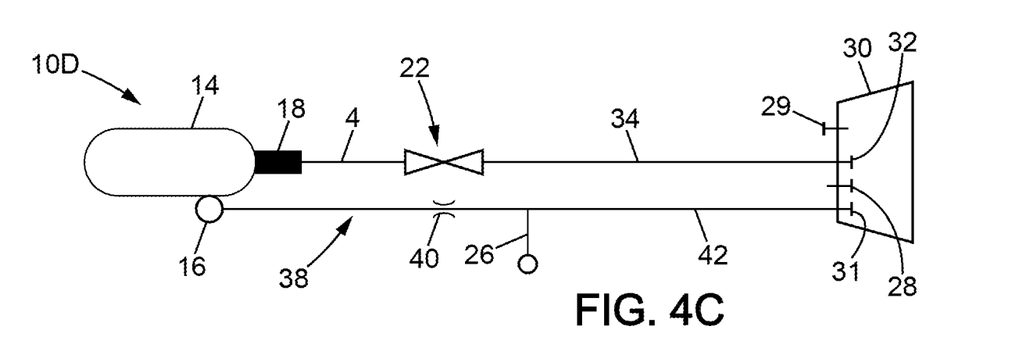

Exemplary system 10D of the present invention is schematically represented by FIG. 4C. System 10D may be similar to system 10C except that the bypass 38 is shown as separate from the flow of respiratory gas from the source 14. Instead, the bypass 38 is supplied by a source of anti-blocking gas 16 and terminating at the face mask 30, effectively forming a second delivery tube 42 in parallel with the main delivery tube 34 and separate from the main delivery tube 34.

Consequently, the source of anti-blocking gas 16 may contain a gas different from the respiratory gas, for instance air or a gas much lighter than oxygen. In a variant, the source of anti-blocking gas 16 is a blower or similar, blowing ambient air into the second delivery tube 42.

The respiration sensor 26 communicates with the second delivery tube 42.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

In particular, the source 16 of anti-blocking gas may supply the face masks with pulses. In such a case, the orifices 40 are replaced by valves distinct from the delivery valves 22 and controlled by the controller 20. The anti-blocking gas is preferably supplied when inhalation is not detected or when exhalation is detected in case the anti-blocking gas is not oxygen, in particular in case the anti-blocking gas is not breathable.

The entire contents of the Cannon patent are incorporated herein by this reference. Further, although each of FIGS. 2, 4A, 4B and 4C illustrates only one face mask 30, persons skilled in the relevant field will recognize that systems 10A, 10B, 10C and 10D are scalable so as to supply multiple face masks 30, as typically would be on-board commercial aircraft. Finally, references to "oxygen" herein need not necessarily refer to gases containing 100% oxygen, but may also refer to other respiratory gases containing at least some oxygen.

What is claimed is:

1. A system for delivering respiratory gas to passengers on-board an aircraft, comprising:
   (i) a source of respiratory gas,
   (ii) at least a face mask for a passenger,
   (iii) a delivery valve interposed between the source of respiratory gas and the face mask associated with the delivery valve, and
   (iv) a pressure sensor configured to detect passenger respiration and send a respiration signal upon detection of the passenger respiration,
   (v) a controller configured to control the delivery valve opening for supplying the face mask with a dose of the respiratory gas based on the passenger respiration detection, and
   (vi) an anti-blocking device configured to supply the face mask with anti-blocking gas, so that blockage is removed,
   wherein the anti-blocking device comprises an orifice configured to allow trickle flow of anti-blocking gas.

2. A system according to claim 1 wherein:
   the pressure sensor is configured to sense a pressure away from the face mask, and
   the anti-blocking device is configured to supply the face mask with the anti-blocking gas, at least between the pressure sensor and the face mask.

3. A system according to claim 1 wherein the anti-blocking device comprises a bypass bypassing the delivery valve so as to allow the trickle flow of anti-blocking gas regardless of a state of the delivery valve.

4. A system according to claim 1 wherein:
   the system comprises a main delivery tube connecting the delivery valve to the face mask,
   a bypass comprises a second delivery tube in parallel with the main delivery tube and terminating at the face mask,
   the orifice is disposed in the second delivery tube, and
   the pressure sensor communicates with the second delivery tube downstream the orifice.

5. A system according to claim 1, wherein:
   the system comprises a main delivery tube connecting the delivery valve to the face mask, and
   the pressure sensor communicates with the main delivery tube downstream a bypass.

6. A method for delivering respiratory gas to passengers on-board an aircraft, comprising:
   detecting respirations of a passenger in a face mask associated to the passenger,
   supplying the face mask with a dose of respiratory gas based on each passenger respiration detection, and
   supplying the face mask with a pulse of anti-blocking gas at a predetermined time after having supplied the face mask with the dose of respiratory gas, the predetermined time being in a range between 10 seconds and 30 seconds, so that an occurrence of blockage preventing detection of respiration is reduced.

7. A method according to claim 6 wherein pulses of the anti-blocking gas are supplied at times differing from times at which doses of the respiratory gas are supplied to the face mask.

8. A method according to claim 6 comprising supplying the face mask with pulses of the anti-blocking gas having a volume in a range between 0.2 milliliter and 3 milliliters.

9. A method according to claim 6 comprising:
   acquiring statistical data relating to a breathing pattern of the associated passenger during several breathing cycles, and
   supplying the face mask with the pulse of anti-blocking gas based on the acquired statistical data.

10. A method according to claim 9 comprising:
    calculating at least an average time period of the breathing cycles of the associated passenger and a threshold time calculated based on the calculated average time period,
    supplying the face mask with the pulse of anti-blocking gas in case the time period of the breathing cycles appears longer than the calculated threshold time.

11. A method according to claim 6 comprising:
    adjusting a volume of the dose of respiratory gas based on a cabin pressure, and
    supplying the face mask with pulses of the anti-blocking gas irrespective of the cabin pressure.

12. A method for delivering respiratory gas to passengers on-board an aircraft, comprising:
    detecting respirations of a passenger in a face mask associated to the passenger,
    supplying the face mask with a dose of respiratory gas based on each passenger respiration detection, and
    comprising supplying each face mask with anti-blocking gas in case of depressurization occurrence, so that an occurrence of blockage, preventing detection of respiration, is reduced.

13. A method according to claim 12 comprising supplying the face mask with the anti-blocking gas either continuously or in a pulsed form and supplying more of the respiratory gas than the anti-blocking gas, preferably 5 times or more of a volume of the respiratory gas than the anti-blocking gas.

14. A method according to claim 12 wherein a trickle flow of the anti-blocking gas is continuously supplied to the face mask and the trickle flow is 10 milliliters per minute or less.

15. A method according to claim 12 wherein the anti-blocking gas is supplied in a pulsed form.

16. A method according to claim 15 comprising supplying the face mask with the pulse of anti-blocking gas at a predetermined time after having supplied the face mask with the dose of respiratory gas, the predetermined time being in a range between 10 seconds and 30 seconds.

* * * * *